United States Patent [19]

Sakamoto et al.

[11] Patent Number: 4,961,257
[45] Date of Patent: Oct. 9, 1990

[54] DOOR ASSEMBLING APPARATUS FOR USE IN AUTOMOBILE ASSEMBLY

[75] Inventors: Shunji Sakamoto, Hiroshima; Junichi Usui; Haruo Oda, both of Osaka, all of Japan

[73] Assignees: Mazda Motor Corporation; Daifuku Company, Ltd., both of Japan

[21] Appl. No.: 449,706

[22] Filed: Dec. 12, 1989

[30] Foreign Application Priority Data

Feb. 2, 1989 [JP] Japan ............................ 1-25201
Feb. 3, 1989 [JP] Japan ............................ 1-26281

[51] Int. Cl.$^5$ ............................................. B23P 19/04
[52] U.S. Cl. ........................................ 29/823; 29/822
[58] Field of Search .................. 29/799, 822, 823, 824; 16/381, 386

[56] References Cited

U.S. PATENT DOCUMENTS 4,589,199  5/1986  Ohtaki et al. ..................... 29/824
4,616,411  10/1986  Suzuki et al. ..................... 29/822

FOREIGN PATENT DOCUMENTS 21793 of 1900 United Kingdom ................. 16/386

Primary Examiner—P. W. Echols
Assistant Examiner—David P. Bryant
Attorney, Agent, or Firm—Webb, Burden, Ziesenheim & Webb

[57] ABSTRACT

A door assembling apparatus for use in automobile assembly having a door transport unit for conveying a door and for maintaining a hinge member of a vehicle body and a corresponding hinge member of a door loosely engaged with each other, a hinge-pin attaching unit for inserting a gib-headed hinge pin through the engaged hinge members, and a stopper for receiving a leading end of the hinge pin as being projected from and through the engaged hinge members. The leading end of the hinge pin increases in diameter through plastic deformation thereof by the contact with the stopper, and this increased diameter effectively prevents disengagement of the pin from the hinge members. With these features, the anti-disengagement operation can be effected very efficiently and conveniently through the plastic deformation of the leading end of the pin which is realized by effectively utilizing the original function of the hinge-pin attaching means, i.e. the function for causing the hinge pin to enter the hinge members. Thus, construction can be formed very simply and economically without requiring special parts.

5 Claims, 13 Drawing Sheets

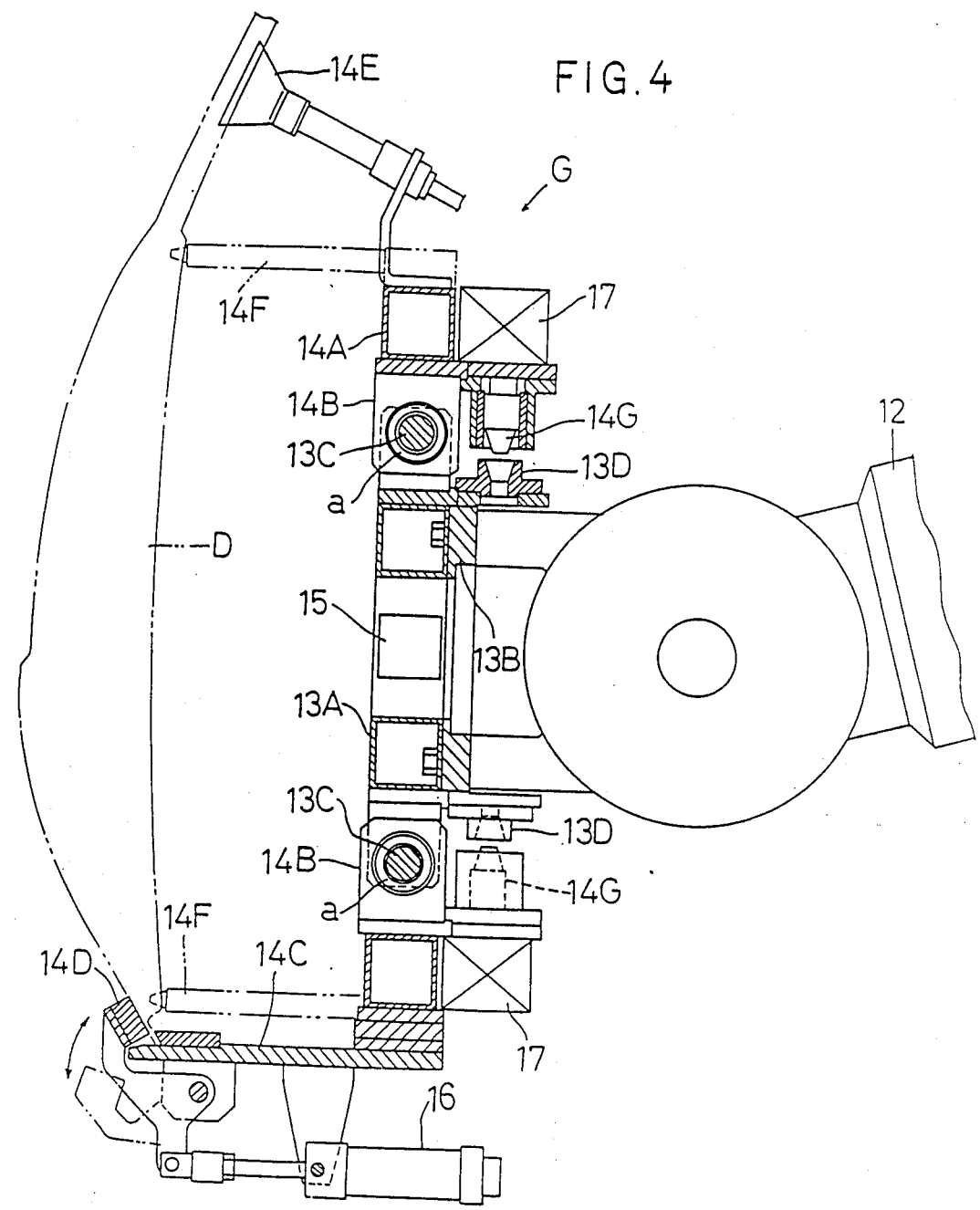

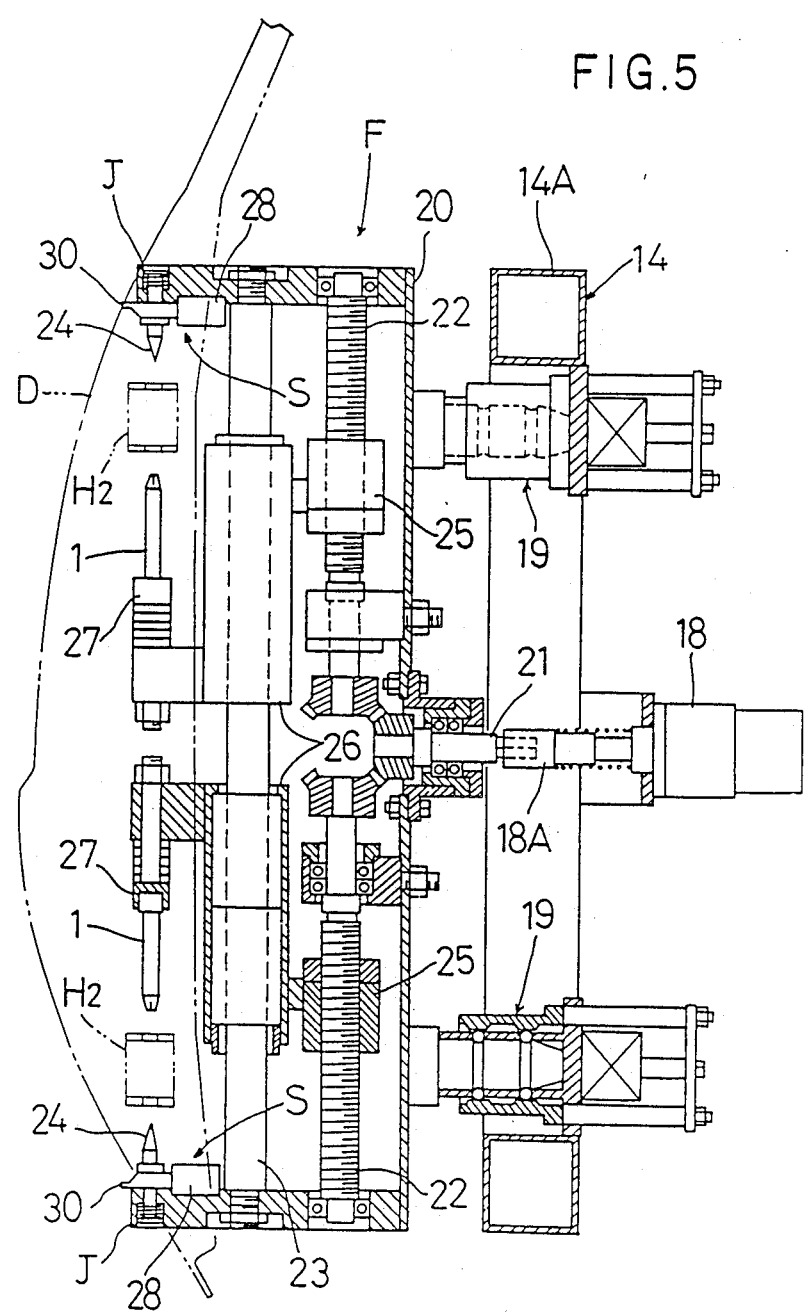

DOOR ASSEMBLING APPARATUS FOR USE IN AUTOMOBILE ASSEMBLY

BACKGROUND OF THE INVENTION

1. Field of the Invention

The present invention relates to a door assembling apparatus for use in automobile assembly, and more particularly to an assembling apparatus of the above-noted kind including a door transport means for conveying a door and for maintaining a hinge member of a vehicle body and a corresponding hinge member of a door loosely engaged with each other, and a hingepin attaching means for inserting a gib-headed hinge pin through the engaged hinge members.

2. Description of the Related Art

In assembling a door with a body of an automotive vehicle, according to the conventional practices, first, a hinge member of the vehicle body is engaged with a corresponding hinge member of the door and then a hinge pin is inserted through the hinge members. Thereafter, a snap ring or the like is attached to the hinge assembly in order to prevent disengagement of the hinge pin.

However, such conventional assembly method is very inefficient since the attaching operation of the snap ring or the like must be carried out manually at considerably limited space between the vehicle body and the door.

The primary object of the present invention is to overcome the above difficulty by providing an improved door assembling apparatus achieving higher operation efficiency.

SUMMARY OF THE INVENTION

For accomplishing the above-described object, a door assembling apparatus for use in automobile assembly, relating to the present invention, comprises:

door transport means for conveying a door and for maintaining a hinge member of a vehicle body and a corresponding hinge member of a door loosely engaged with each other;

hinge-pin attaching means for inserting a gib-headed hinge pin through the engaged hinge members; and a stopper for receiving a leading end of the hinge pin as being projected from and through the engaged hinge members;

said leading end of the hinge pin increasing in a diameter through plastic deformation thereof by the contact with the stopper.

Functions and effects of the above-described construction will be described next.

According to the door assembling apparatus for use in automobile assembly, having the characterizing features of the invention, as the hinge pin is inserted through the loosely engaged hinge members of the vehicle body and of the door, the leading end of the hinge pin increases in the diameter through its contact with the stopper and this increased diameter effectively prevents disengagement of the pin from the hinge members.

Accordingly, with the present invention, it has become unnecessary to carry out an anti-disengagement operation at a subsequent process, and therefore the operation efficiency has been improved.

Moreover, since the anti-disengagement operation is carried out by effectively utilizing the original function of the hinge-pin attaching means, i.e. the function for causing the hinge pin to enter the hinge members, the construction can be formed very simply without requiring special parts.

Incidentally, the operational force required for the insertion of hinge pin is set significantly large enough to permit insertion of the same even when there exists positional displacement between the hinge members. And, the plastic deformation of the leading end of the hinge pin is realized by utilizing such large operational force.

Further and other objects, features and effects of the invention will become apparent from the following more detailed description of the embodiments of the invention with reference to the accompanying drawings.

BRIEF DESCRIPTION OF THE DRAWNGS

Accompanying drawings illustrate, preferred embodiments of a door assembling apparatus for use in automobile assembly; in which, FIG. 1 is a schematic plane view of a door assembling apparatus for automobile assembly, FIG. 2 is a front view of the door assembling apparatus, FIG. 3 is a front view of a door holding frame, FIG. 4 is a side view of the door holding frame, FIG. 5 is a side view of a hinge-pin attaching means, FIGS. 6(a), 6(b) and 6(c) are side views illustrating operational procedures of inserting a hinge pin.

Figure 16A:
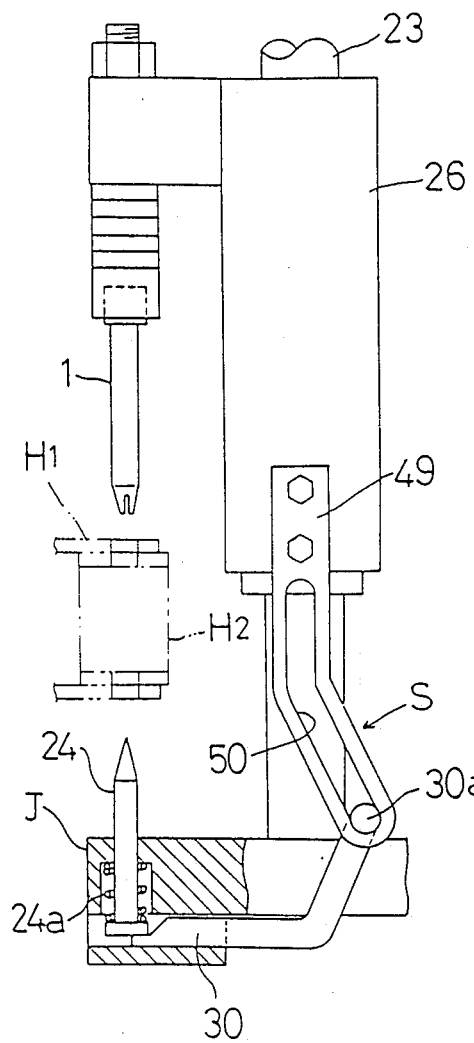
Figure 16B:
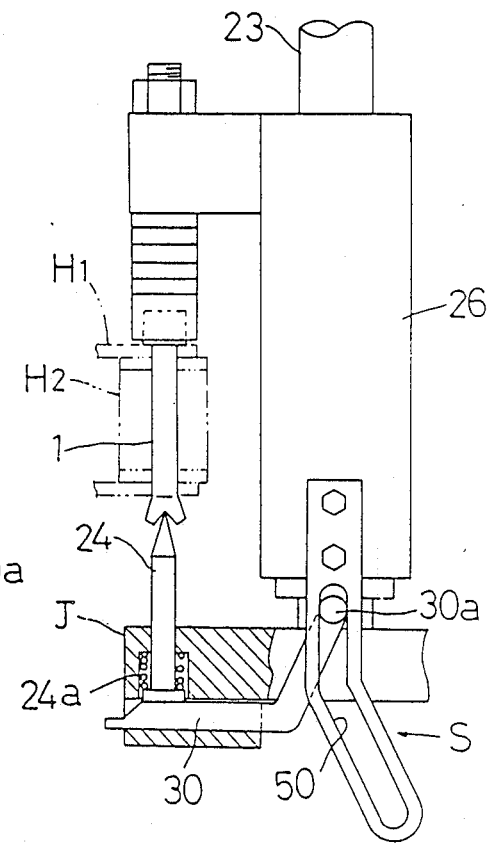
Figure 17A:
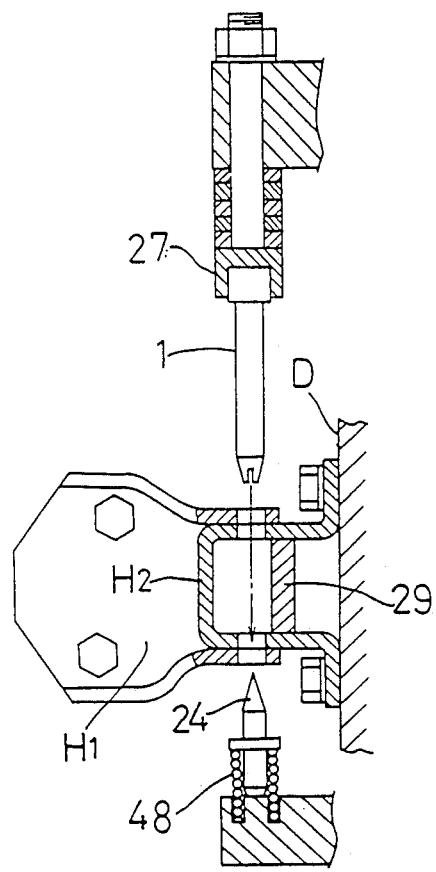
Figure 17B:
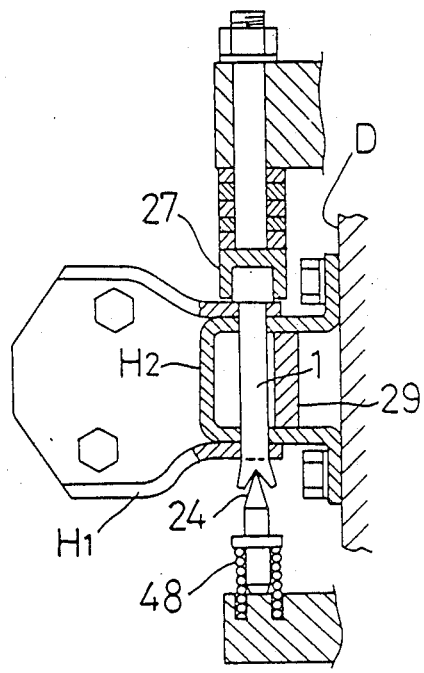
Figure 17C:
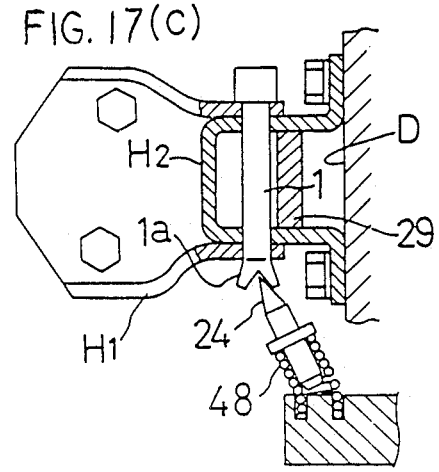
Figure 18:
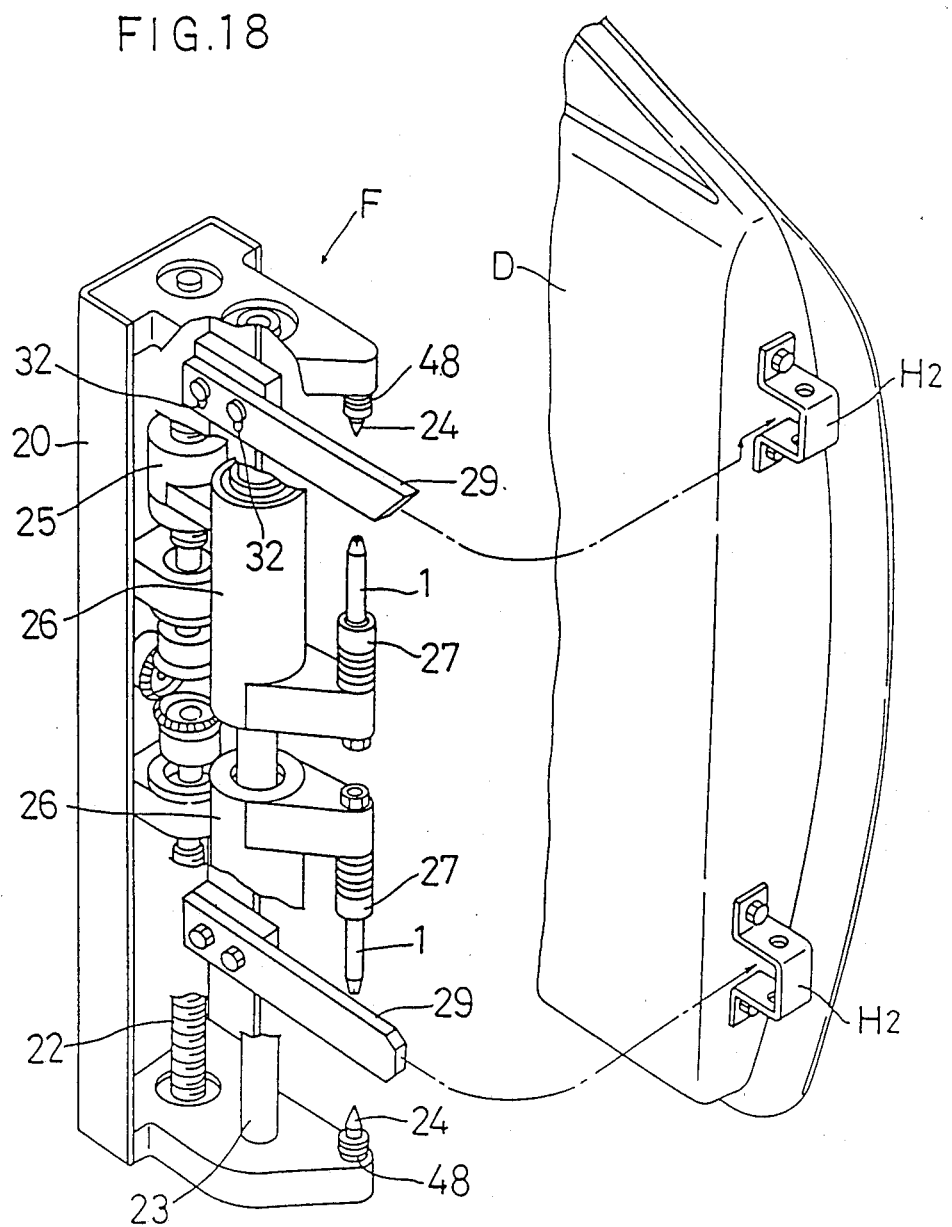

FIGS. 16(a) and 16(b) are side views showing a stopper operating means of a further embodiment, FIGS. 17(a), 17(b) and 17(c) are side views illustrating procedures of inserting the hinge pin using a stopper operating means of a still further embodiment, and FIG. 18 is a perspective view of a hinge-pin attaching means shown in FIG. 17.

DETAILED DESCRIPTION OF THE PREFERRED EMBODIMENTS

Preferred embodiments of the present invention will be particularly described hereinafter with reference to the accompanying drawings.

Figure 1:
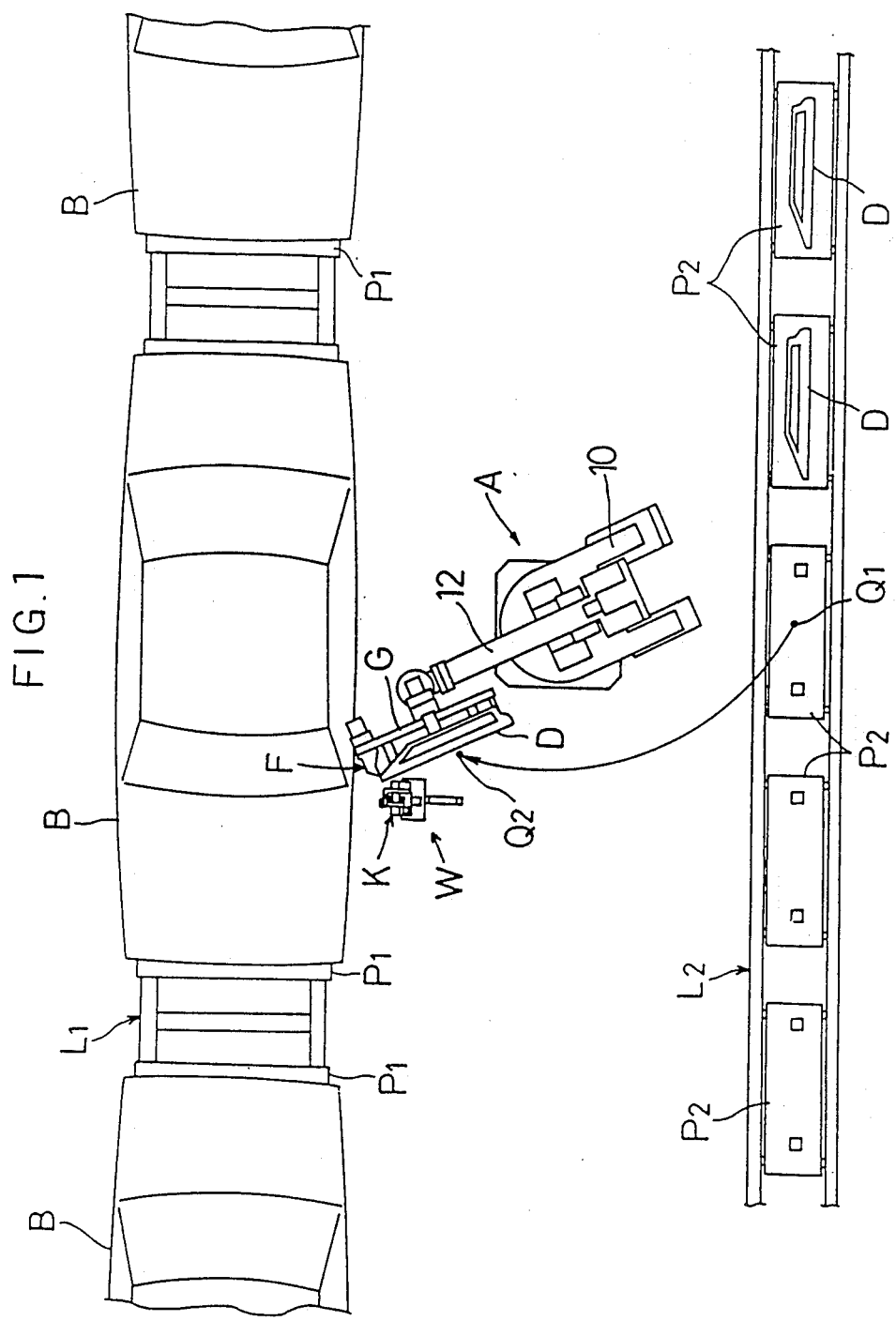
Figure 2:
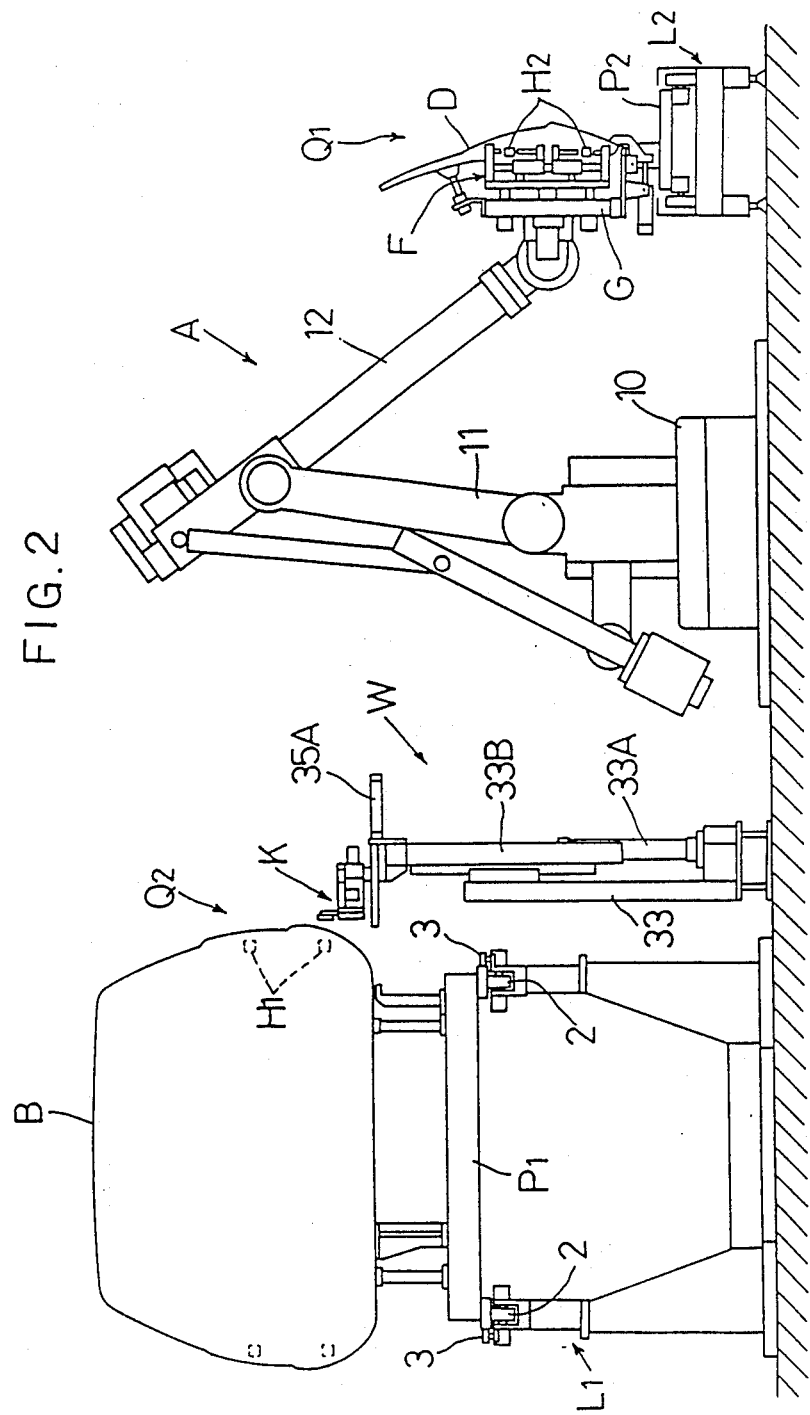
Figure 3:
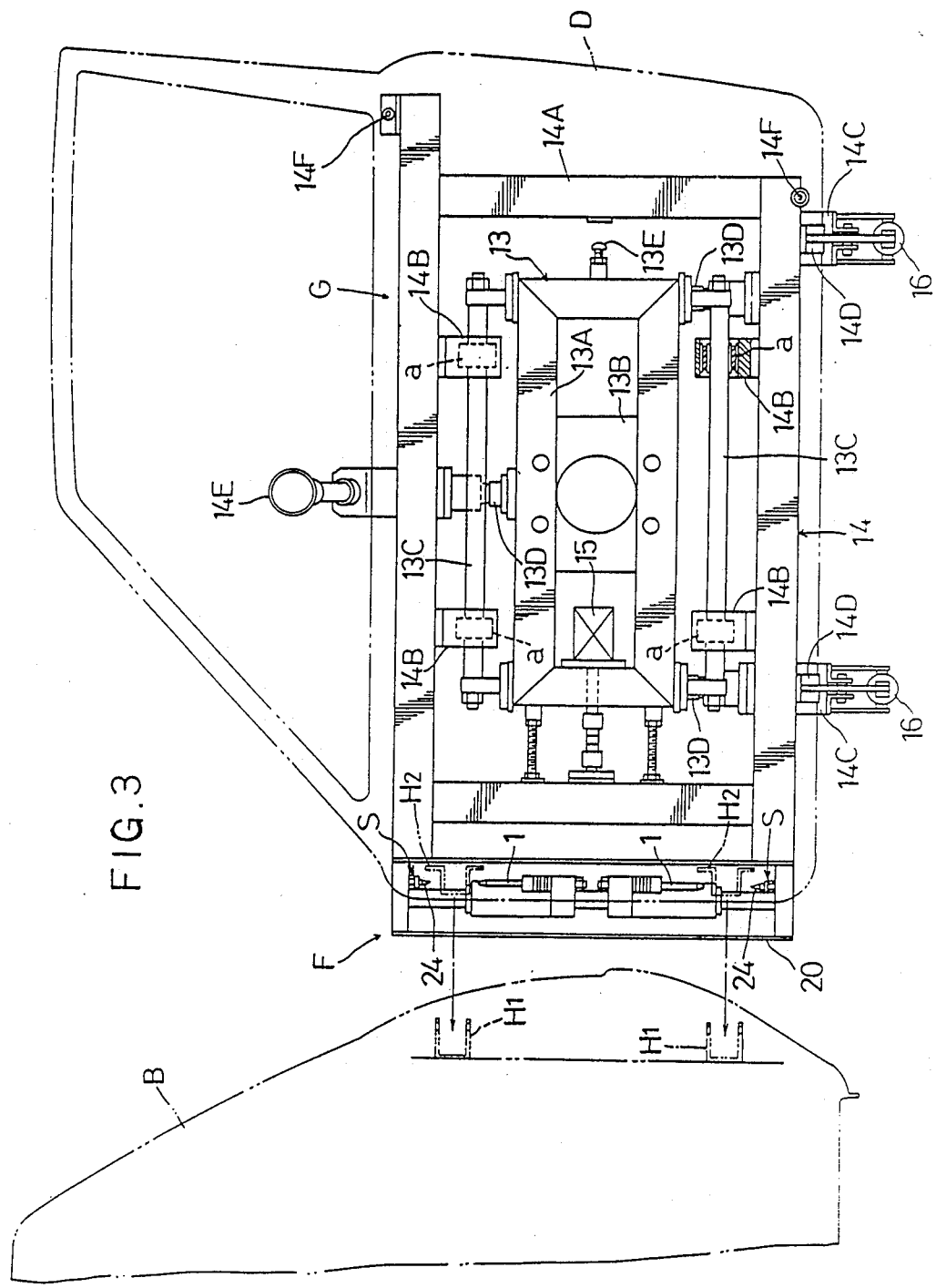

As shown in FIGS. 1 and 2, a door assembling apparatus, related to the present invention, for automobile assembly consists essentially of a body conveying line L1 for conveying a body B of an automotive vehicle, a door conveying line L2 for conveying a door D to be assembled with the vehicle body B, a door transport means A for holding and transporting the door D in order to bring a hinge member H2 of the door into engagement with a hinge member H1 of the vehicle body B and of a control means E (see FIG. 14) for directing the door transport means A to a door-receiving position Q1 or to a door-engaging position Q2 based on stored information. Further, as illustrated in FIG. 3, the door transport menas A includes a hinge-pin attaching means F for inserting a gib-headed hinge pin 1 through the hinge members H1 and H2 held in position.

In an assembling operation of the door D using the above-described construction, the door transport means A picks up the door D being conveyed on the door conveying line L2 and transports this door to bring the hinge member H2 of the door D into engagement with the hinge member H1 of the vehicle body B being conveyed on the body conveying line L1, and then the hinge-pin attaching means F of the transport means A inserts the hinge pin 1 through the engaged hinge members H1 and H2.

The respective elements of the above construction will be specifically described hereinafter.

The body conveying line L1 is used for conveying thereon a pallet P1 holding the vehicle body B in position. The body conveying line L1 includes guide rollers 2 for supporting and guiding a lower face of the pallet P1, further rollers 3 for supporting and guiding lateral faces of the pallet P1 and a moving means for moving the pallet P1. This moving means may comprise e.g. a moving member movable along guide rails to move and stop the pallet P1 intermittently for a door assembly and then to further move the pallet P1 downstream in the conveying direction after completion of the assembly.

The door conveying line L2 is used for conveying thereon a pallet P2 holding the door D in position and has a construction similar to that of the above-described body conveying line L1. In operation, this door conveying line L2 stops the pallet P2 at the door receiving position Q1 to allow the door transport means A to pick out the door D at this position and then moves the emptied pallet P2 downstream in the conveying direction.

As shown in FIG. 2, the door transport means A includes a swivel deck 10, a pivot frame 11 mounted on the deck 10 to be pivotable back and forth relative thereto about a horizontal axis, an arm 12 attached to a distal end of the pivot frame 11 to be vertically pivotable relative thereto about a further horizontal axis, and a door holding frame G attached to a distal end of the pivot arm 12 to be pivotable about a fore-and-aft axis extending along a longitudinal direction of the arm 12 and pivotable also about a lateral axis extending normal to the fore-and-aft axis. The door holding frame G includes the hinge-pin attaching means F.

As shown in FIGS. 3 and 4, the door holding frame G essentially consists of a base frame portion 13 and a door support portion 14 slidably supported to the base frame position 13 to be positionally adjustable relative thereto.

The base frame portion 13 essentially includes a frame member 13A consisting of square pipes arranged in a rectangular formation, a link frame 13B for linking the frame member 13A with the pivot arm 12, a pair of guide shafts 13C disposed at upper and lower positions of the frame member 13A and a slide cylinder 15 for the door support portion 14. Further, three engaging portions 13D corresponding to engaging members 14G (will be described later) are provided at one upper position and two lower positions of the frame member 13A.

Also, a reference mark 13E in FIG. 3 denotes a contact portion which comes into contact with the door support portion 14 for limiting amount of a sliding movement of this portion 14 resulting from activation of the cylinder 15.

The door support portion 14 includes, as a base thereof, a frame member 14A consisting of square pipes arranged in a rectangular formation. This frame member 14A has four hollow frames 14B slidably fitted on the upper and lower guide shafts 13C, a pair of right and left door receiving frames 14C connected to lower ends of the frame member 14A, a pair of right and left clamps 14D pivoted by means of cylinders 16 for clamping lower ends of the door D between the clamps 14D and the door receiving frames 14C, a suction pad 14E for holding a window of the door D by sucking the same, a pair of upper and lower positioning pins 14F engageable with the door D, engaging members 14G engageable with and disengageable from the engaging portions 13D with projecting or retracting motion of cylinders 17, and a motor 18 for driving the hinge-pin attaching means F.

Each of the hollow frames 14B includes an elastic element 'a' which permits displacement of the door support portion 14 relative to the upper or lower guide shaft 13C.

With the above-described construction in operation, the door D is fixedly positioned by the upper and lower guide shafts 14F and maintained at this position by means of the paired clamps 14D and the suction pad 14E. Accordingly, the door transport means A receives and holds the door D at the door-receiving position Q1 with the above-described states and then transports this door D to the door-engaging position Q2. Also, in these operations, the engaging members 14G and the engaging portions 13D are engaged with each other.

Next, there will be detailed an engaging operation between the body hinge member H1 and the door hinge member H2 carried out at the door-engaging portion Q2.

First, the door transport means A transports the door D to vicinity of the vehicle body B through cooperative operations of the swivel deck 10, the pivot frame 11, the pivot arm 12 and of the door holding frame G. Second, the cylinders 17 are retracted to release the engaging members 14G from the engaging portions 13D. Third, the further cylinder 15 is activated to allow a predetermined amount of projection of the door support portion 14 thereby to engage the hinge members H1 and H2 with each other.

In the course of the above projecting operation of the door support portion 14, a small vertical displacement, if any, between the hinge members H1 and H2 can be effectively offset by elastic deformation of the elastic elements 'a' thereby to enable smooth and reliable engagement between these hinge members H1 and H2 in such case also.

Further, for an inserting operation of the hinge pin 1 to be more particularly described later, the cylinder 15 is maintained freely expandable and retractable.

Next, the hinge-pin attaching means F will be detailed.

Referring to FIG. 5, this hinge-pin attaching means F includes a base frame 20 detachably supported to the door support portion 14 via a pair of upper and lower connecting portions 19. The base frame 20 mounts an input shaft 21 connectable to and disconnectable from an output shaft 18A of the motor 18, a pair of vertically oriented threaded shafts 22 operatively connected with the input shaft 21 via bevel gears, a guide shaft 23 disposed in parallel with the threaded shafts 22, a pair of upper and lower stopper holding portions J, a pair of coma members 25 slidably threaded respectively on the threaded shafts 22, and a pair of slider members 26 rigidly connected with the coma members 25 and slidably fitted on the guide shaft 23. Each slider member 26 has a holder 27 for holding the hinge pin 1 by utilizing a magnet.

Figures 7, 8:
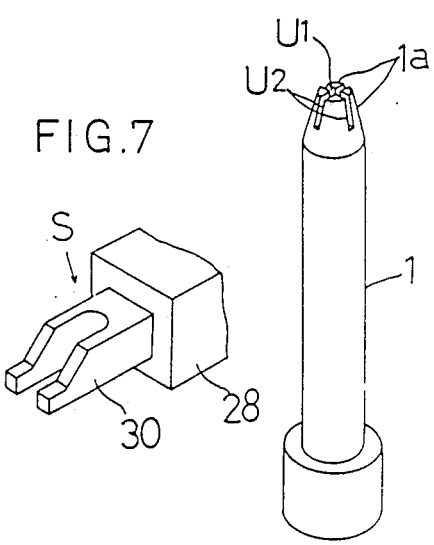
FIG. 7 is a perspective view of a holding member.
FIG. 8 is a perspective view of the hinge pin.

Each of the stopper holding portions J includes a stopper 24 for receiving a leading end of the hinge pin 1 as being projected from and through the hinge members H1 and H2. This stopper 24 is biased in a direction away from the hinge pin 1 by means of a spring 24a. The stopper holding portion J further includes a holder member 30 moved back and forth by a cylinder 28 to move the stopper 24 between an operative position for receiving the end of the hinge pin 1 and a retracted position retracted longitudinally away from the pin 1. As best shown in FIG. 7, this holder member 30 has an inclined face for its contact with the stopper 24, such that the stopper 24 is moved longitudinally along the pin 1 with the projecting or retracting motion of the cylinder 28. This construction constitutes a stopper control means S which permits non-interference between the stopper 24 and the hinge pin 1 when the door assembling apparatus is released from the door D thereby to smoothe this releasing operation.

Further, as illustrated in FIG. 8, the hinge pin 1 has a leading end which comes in contact with the stopper 24. This contact increases the leading end diameter through plastic deformation. More particularly, this leading end of the hinge pin 1 has a truncated conical shape defining a pluarlity of cut grooves U2 extending continuously and radially from a common central hole U1. Whereas, the stopper 24 has a tapered leading end.

Figure 6A:
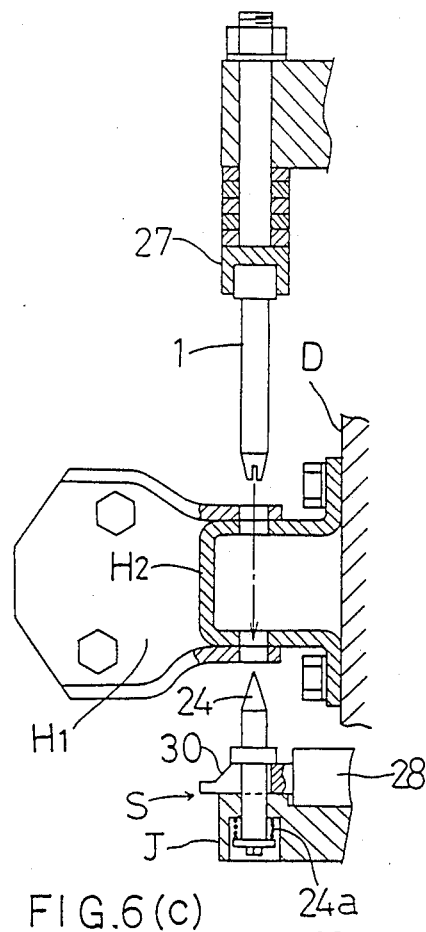
Figure 6C:
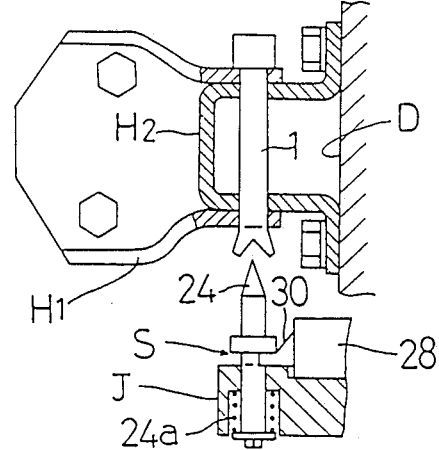
Figure 6B:
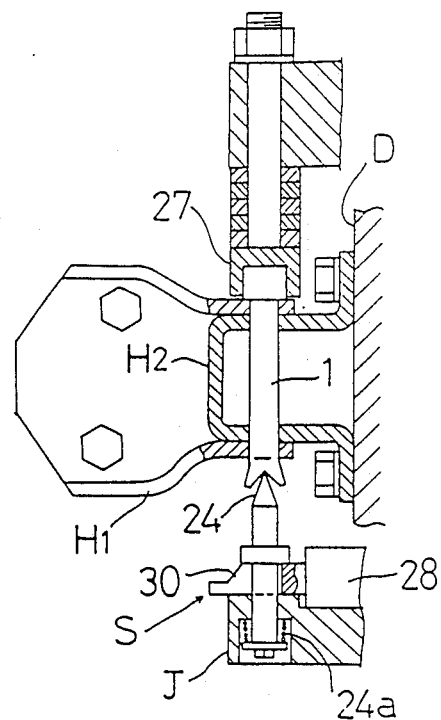

As such leading end of the hinge pin 1 comes into contact with the tapered end of the stopper 24, the former easily deforms in a manner as illustrated in FIG. 6(b). And, this deformation requires smaller force than compressive deformation, but the former achieves more reliable stopping, i.e. anti-disengagement effect than the latter.

Figure 9:
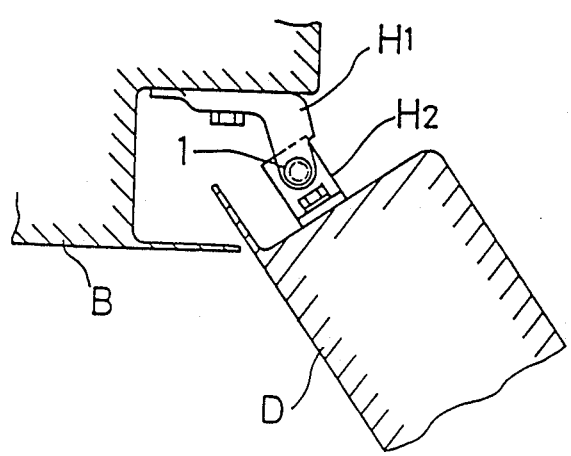
FIG. 9 is a plane view showing an engaged condition of hinge members.

Next, an inserting operation of the hinge pin 1 will be detailed. First, as illustrated in FIGS. 6(a) and 9, the body hinge member H1 and the door hinge member H2 are brought into loose engagement with each other. During this, the stopper 24 is held at its operative position for receiving. Next, as illustrated in FIG. 6(b), by energizing the motor 18, the holder 27 is moved towards the engaged hinge members. Thereafter, the hinge pin 1 is inserted through the hinge members H1 and H2. With this insertion, there occurs the diameter-increasing plastic deformation on the leading end of the hinge pin 1, which increased diameter effectively prevents disengagement of the hinge pin 1 from the hinge members H1 and H2. After completion of this inserting operation, as illustrated in FIG. 6(c), the stopper 24 is moved back to its retracted position and then the door support frame G is released.

Next, the control means E will be detailed.

Figure 14:
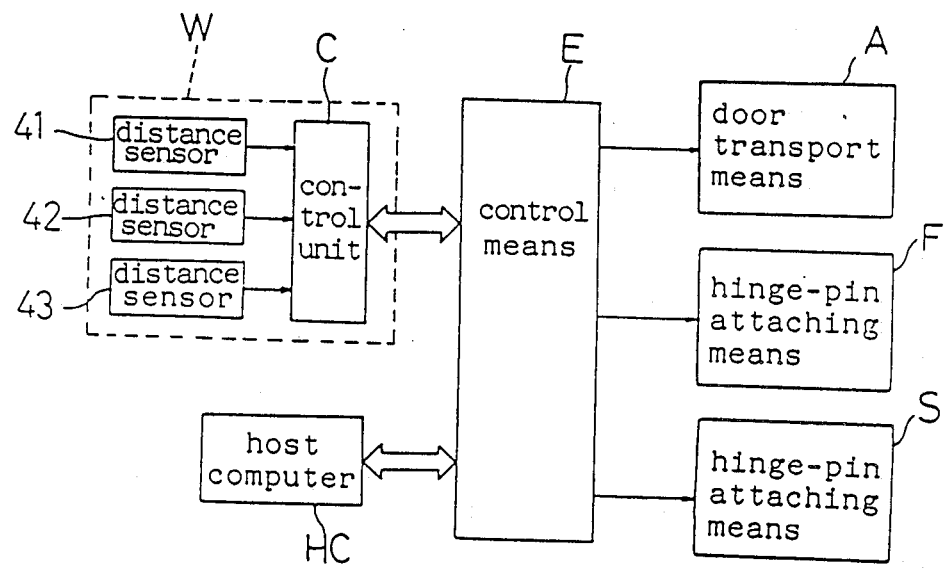
FIG. 14 is a block diagram of a control unit.

This control means E, as shown in a block diagram of FIG. 14, controls entire assembly operations of the door D by controlling operations of the door transport means A, the hinge-pin attaching means F and various actuators based on predetermined control information stored therein.

Further, in order to assure proper engagement between the hinge members H1 and H2 even when there occurs positional displacement therebetween mainly due to displacement of the vehicle body B, there is provided, in operative connection with the control means E, a measuring means W for measuring a position of the vehicle body hinge member H1. The measuring means W transmits the measurement result to the control means E in order for the latter to make adjustment in its stored information. Incidentally, this stored information is variably set in response to information from a host computer HC representative of e.g. a change in the type of vehicle. And, the setting operation of the information is carried out through so-called teaching operations.

Figure 10:
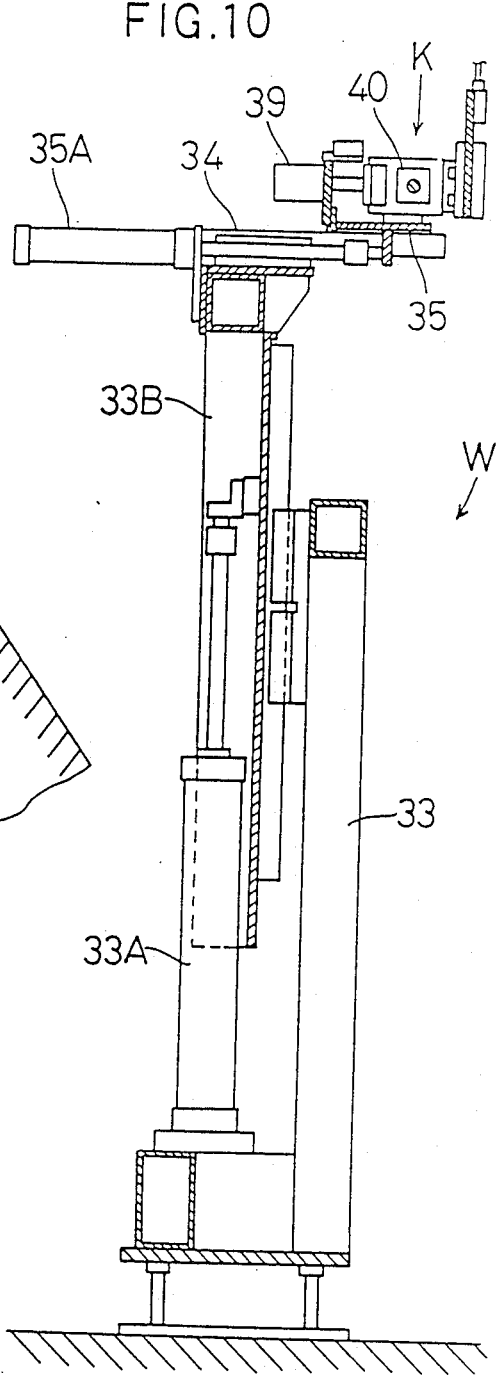
FIG. 10 is a side view of a measuring means.

The measuring means W, as shown in FIG. 10, includes a lift frame 33B vertically movable along a strut 33 by means of a cylinder 33A, a support table 34 attached on an upper end of the lift frame 33B, a movable frame 35 slidable along the support table 34 by means of a further cylinder 35A, a measuring unit K supported on the movable frame 35 and a control unit C for controlling the measuring unit K. Further, though not shown or described in details, there are provided sensors for sensing a vertical position of the lift frame 33B and a slide position of the movable frame 35, and the actuations of the cylinders 33A and 35A are effected based on the detections of these sensors as well as on the stored information.

Accordingly, the movable frame 35 is moved to vicinity of the hinge member H1 which is the measurement object, and at this condition, measurement of the position of the hinge member H1 is carried out by the measuring unit K. In moving the movable frame 35, a target position of this movable frame 35 relative to the hinge member H1 is set relative to the strut 33. Further, this target position is varyingly set in accordance with e.g. the types of the vehicle body B. This is to say that the stored information is varyingly set.

Next, the measuring unit K will be detailed. In the following description, it is to be noted, an axis X corresponds to the force and aft direction of the vehicle body B, an axis Y corresponds to the width direction of the same, and an axis Z corresponds to a perpendicular direction.

Figure 11:
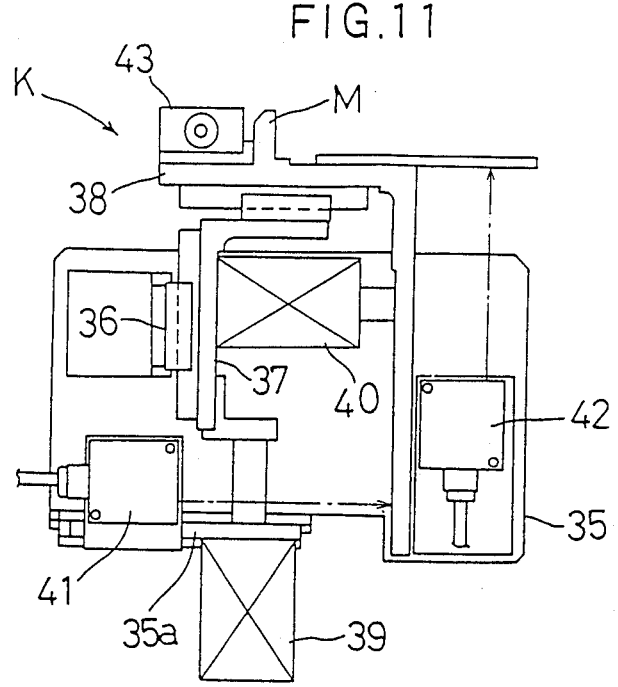
FIG. 11 is a plane view of a measuring unit.
Figure 12:
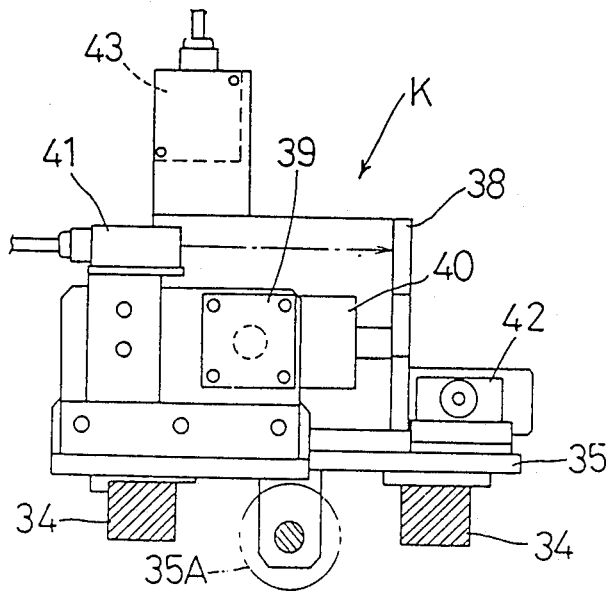
FIG. 12 is a side view of the measuring unit.
Figure 13:
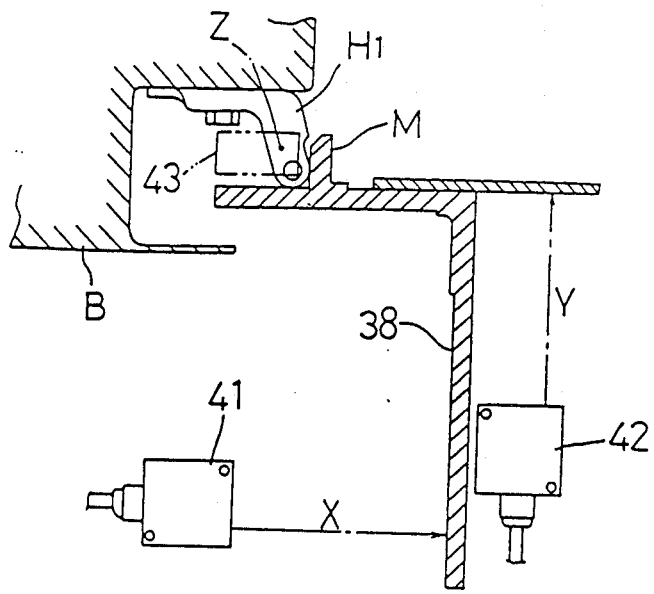
FIG. 13 is a plane view showing a contacting condition between the hinge member of the vehicle body and a contact portion.

As illustrated in FIGS. 11 and 12, an Y-axis guide member 36 fixedly secured to the movable frame 35 supports an X-axis guide member 37 having a hook-like configuration in plane view, with the guide member 37 being slidable along the axis Y. Further, a measuring tool 38 having a letter 'T' shaped configuration in plane view is supported to the X-axis guide member 37 to be slidable along the X axis. Between a bracket 35a attached to the movable frame 35 and the X-axis guide member 37, there extends a cylinder 39 for sliding the X-axis guide member 37 along the Y axis. Moreover, between the measuring tool 38 and the X-axis guide member 37, there extends a further cylinder 40 for sliding the measuring tool 38 along the X axis. The measuring tool 38, as shown also in FIG. 13, includes a contact portion M having a letter 'L'-shaped configuration in plane view to come into contact with the measurement-object hinge member H1 from the X axis direction and also from the Y axis direction. On the other hand, the movable frame 35 fixedly carries a distance sensor 41 for sensing an X-axis position of the measurement tool 38 and a further distance sensor 42 for sensing a Y-axis position of the same. A still further distance sensor 43 for sensing distance between the measuring tool 38 and an upper face of the hinge member H1 is attached on the upper face of the measuring tool 38. These distance sensors 41, 42 and 43 can comprise various types such as those utilizing laser beam.

With the above-described construction in operation, first, the measuring tool 38 is moved along the Y axis and then along the X axis to come into abutment against the measurement-object hinge member H1. Then, in this condition, the position of the hinge member H1 can be obtained based on the detection information of the respective distance sensors 41, 42 and 43.

Then, this information concerning the detected position of the hinge member H1 is transmitted via the control unit C to the control means E. And, based on this transmitted information, the control means E executes adjustment of the currently stored information.

Figure 15:
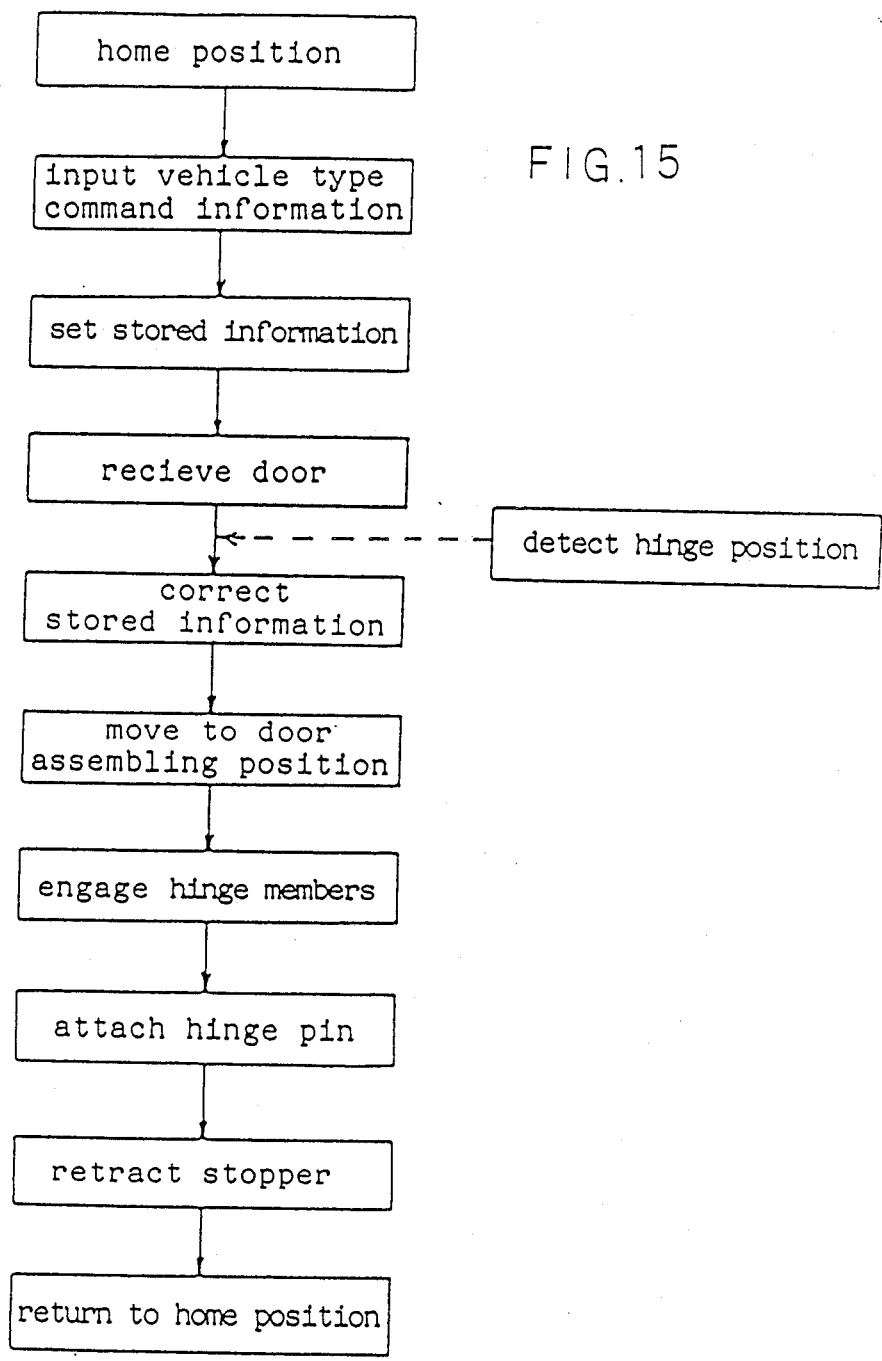
FIG. 15 is an algorithm employed in a door assembling procedure.

Next, the procedures taken for the door assembly operation will be detailed step by step with reference to an algorithm shown in FIG. 15.

First, upon receipt of vehicle type command information from the host computer HC, the control means E sets information to be stored corresponding to the host computer information. Then, the door transport means A receives the door D at the door-receiving position Q1. On the other hand, the measuring means W obtains a position of the hinge member H1 of the vehicle body B, based on which detection the control means E corrects the previously stored information. Then, based on this corrected information, the door transport means A transports the door D to the door-engaging position Q2 to engage the hinge members H1 and H2 with each other and inserts the hinge pins 1 through the engaged hinge members H1 and H2. Thereafter, the stoppers 24 are retracted from the projecting positions to return to their home positions. At this condition, the door transport means A is ready to receive next command.

Next, some modified alternate embodiments of the invention will be specifically described.

In the foregoing embodiment, the stopper control means S is so constructed that the holder members 30 are projected and retracted by means of the cylinders 28. Instead, it is also conceivable to utilize the hinge-pin attaching means F for projecting and retracting the holder members 30. That is to say, as illustrated in FIGS. 16(a) and 16(b), for this modified arrangement, an engaging portion 49 is attached to the slider member 26 of the hinge-pin attaching means F, and this engaging portion 49 defines an engaging slit 50 having a cam function. Then, as this engaging slit 50 comes into engagement with the engaging member 30a of the holder member 30, the stopper 24 is moved between an operative position for receiving the stopper 24 and a retracted position with an energization of the motor 18. It is further conceivable to attach the stopper 24 to a free end of a cylinder or the like so that the stopper 24 may project and retract directly. In these ways, the specific construction of this stopper control means S can vary in may ways depending on the necessity.

A further modified arrangement of the stopper control means S is illustrated in FIG. 17.

In this arrangement, the stopper 24 is fitted in a coil spring 48 so as to be tiltable and also to automatically return to its home, i.e. erected position by the urging force of the spring 48.

The attaching and inserting procedures of the hinge pins 1 will be additionally described next. Under the condition where the hinge members H1 and H2 are loosely engaged each other as illustrated in FIGS. 17(a) and 9, the motor 18 is energized to move the holder 27 close to the engaged hinge members H1 and H2. Then, as illustrated in FIG. 17(b), the hinge pin 1 is inserted through the hinge members H1 and H2. With this insertion, there occurs the diameter-increasing plastic deformation at the leading end of the hinge pin 1, which increased diameter effectively prevents disengagement of the pin 1 from the hinge members H1 and H2.

After the above attachment of the hinge pin 1, the door holding frame G is moved away from the vehicle body B, during which, as illustrated in FIG. 17(c), the stopper 24 engaged with the leading end of the hinge pin 1 gradually tilts about its contact point with the pin end and eventually disengages from the same. Incidentally, when the door holder frame G is moved away from the vehicle body B, the hoder 27 is held at its retracted position away from the hinge members H1 and H2.

Reference numeral 29 denotes a plate type anti-deformation member for preventing deformation of the hinge members H1 and H2 during insertion of the hinge pin 1 therethrough. A pair of this anti-deformation member 29, as illustrated in FIG. 18, are provided respectively for the upper and lower assemblies of the hinge members H1 and H2. And, these anti-deformation members 29 are attached to the base frame 20 of the hinge-pin attaching means F. When the door D is held at the door-receiving position Q1, the door holding frame G is moved with reference to the lower hinge member H2 of the pair of upper and lower door hinge members H1, H2. Therefore, the upper anti-deformation member 29 is supported through elongated slots 32 so as to be vertically position-adjustable relative to the base frame 20. Further, this upper anti-deformation member 29 has a sloped leading edge gradually inclined upwards as approaching its terminal, i.e. free end, such that the anti-deformation member 29 enters the hinge member H2 as moving upwards through its contact with the hinge member H2.

Compared with the conventional construction where the position of the stopper 24 is varyingly adjusted, the above-described construction of the stopper control means S is simple and yet capable of assuring reliable disengagement of the stopper 24 from the hinge pin 1. That is, since the stopper 24 is supported by the coil spring 48, the construction of very simple and inexpensive.

Moreover, the plastic deformation property of the leading end of the hinge pin 1 can be obtained also by forming this portion with material softer, i.e. more deformable than the material used in the remaining portion of the hinge pin 1. Varied and still many other arrangements will be obvious for one skilled in the art to obtain this plastic deformation property, and the shape of the stopper 24 can be varied accordingly. Also, the specific constructions of the rest of the elements can be varied in many other ways in accordance with the convenience and necessity.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A door assembling apparatus for use in automobile assembly, comprising:

door transport means for conveying a door and for maintaining a hinge member of a vehicle body and a corresponding hinge member of a door loosely engaged with each other;

hinge-pin attaching means for inserting a gib-headed hinge pin through the engaged hinge members; and a stopper for receiving a leading end of said hinge pin as being projected from and through the engaged hinge members;

said leading end of the hinge pin increasing in diameter through plastic deformation thereof by contact with said stopper.

2. A door assembling apparatus as defined in claim 1, wherein said leading end of the hinge pin has a truncated conical shape defining a pluarlity of cut grooves extending continuously and radially from a common central hole and said stopper has a tapered leading end.

3. A door assembling apparatus as defined in claim 2, further comprising:

stopper control means for moving said stopper between a receiving position and a retracted position longitudinally away from said hinge pin.

4. A door assembling apparatus as defined in claim 1, further including means for supporting said stopper so that said stopper will automatically return to its home, erected position if tilted.

5. A door assembling apparatus as defined in claim 4, wherein said supporting means comprises a coil spring disposed longitudinally along said stopper.

* * * * *

UNITED STATES PATENT AND TRADEMARK OFFICE
CERTIFICATE OF CORRECTION

PATENT NO. : 4,961,257

DATED : October 9, 1990

INVENTOR(S) : Shunji Sakamoto, Junichi Usui and Haruo Oda

It is certified that error appears in the above-identified patent and that said Letters Patent is hereby corrected as shown below:

Under References Cited FOREIGN PATENT DOCUMENTS
"21793 of 1900 United Kingdom ... 16/386" should read
--21793 8/1900 United Kingdom ... 16/386--.

Abstract Line 10 after "in" insert --a--.

Column 1 Line 13 "hingepin" should read --hinge-pin--.

Column 2 Line 18 after "illustrate" delete --,--.

Column 2 Line 29 "." should read --,--.

Column 2 Line 40 ";" should read --,--.

Column 6 Line 19 "details" should read --detail--.

Column 6 Line 37 "force" should read --fore--.

UNITED STATES PATENT AND TRADEMARK OFFICE
CERTIFICATE OF CORRECTION

PATENT NO. : 4,961,257

DATED : October 9, 1990

INVENTOR(S) : Shunji Sakamoto, Junichi Usui and Haruo Oda

It is certified that error appears in the above-identified patent and that said Letters Patent is hereby corrected as shown below:

Column 7 Line 64 after "engaged" insert --with--.

Column 8 Line 12 "hoder" should read --holder--.

Column 8 Line 42 "of" should read --is--.

Claim 1 Line 10 Column 9 after "by" insert --the--.

Claim 2 Line 15 Column 9 "pluarlity" should read --plurality--.

Signed and Sealed this

Twenty-first Day of April, 1992

*Attest:*

HARRY F. MANBECK, JR.

*Attesting Officer*  *Commissioner of Patents and Trademarks*